Patented Aug. 26, 1947

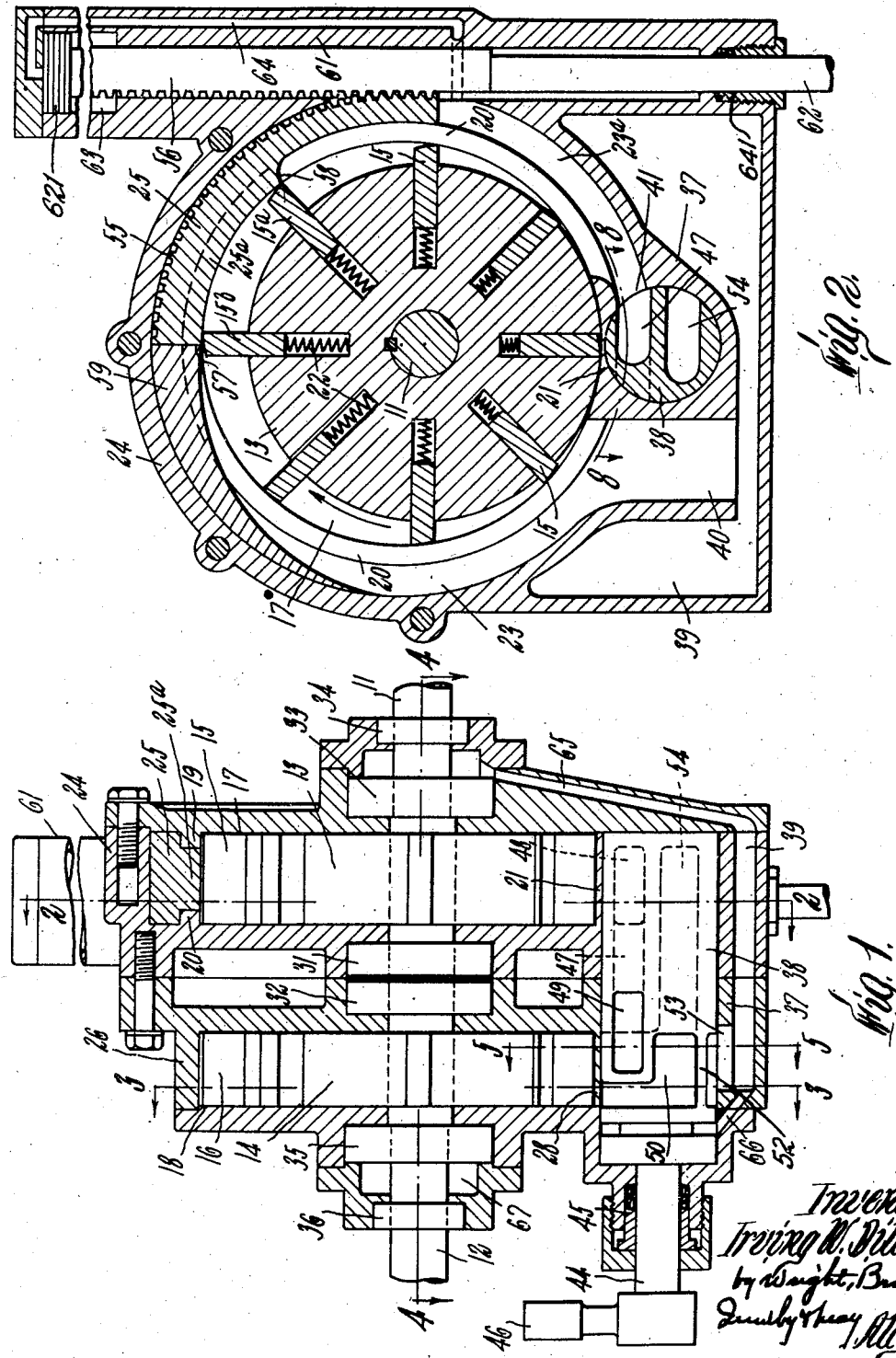

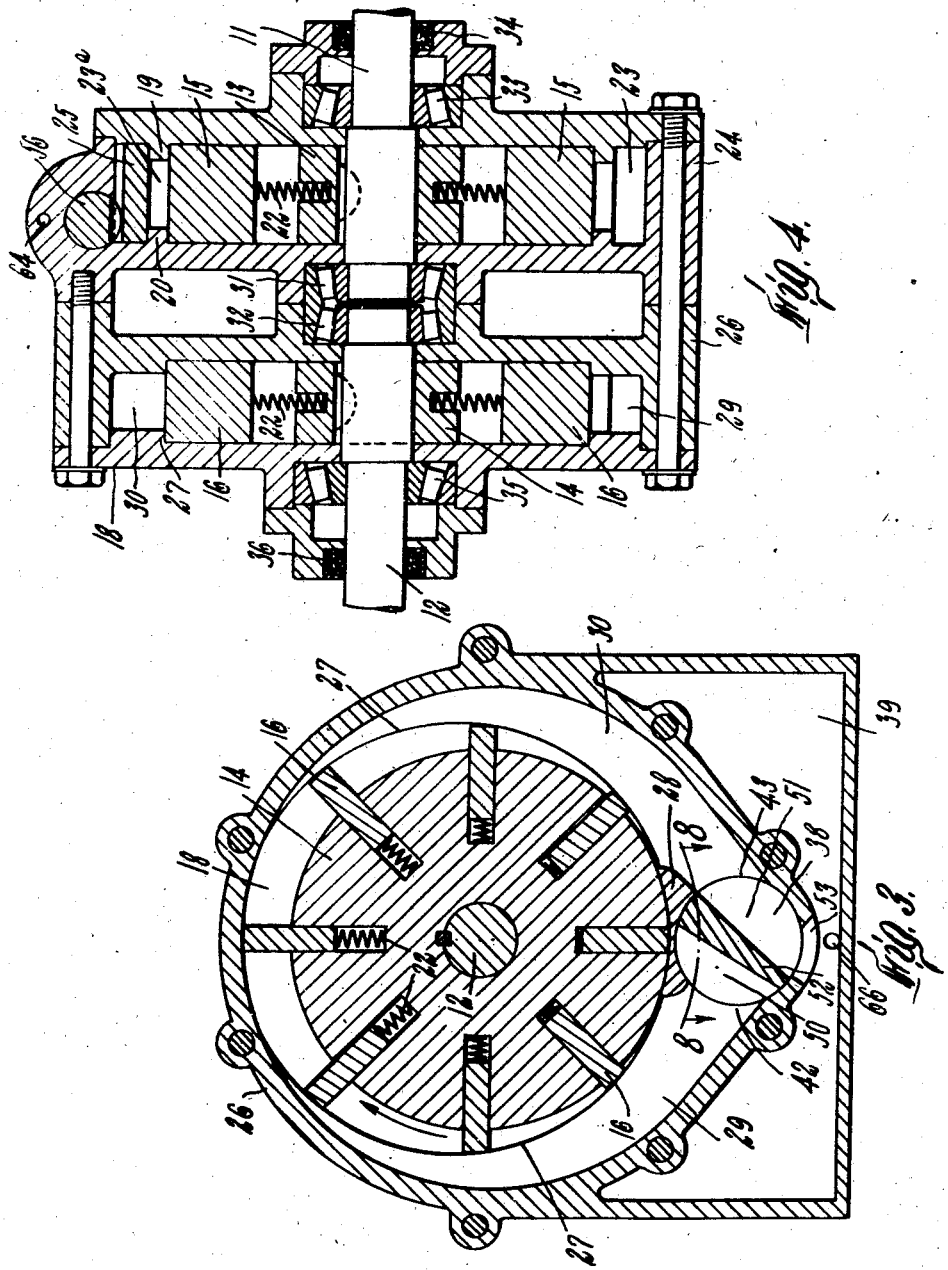

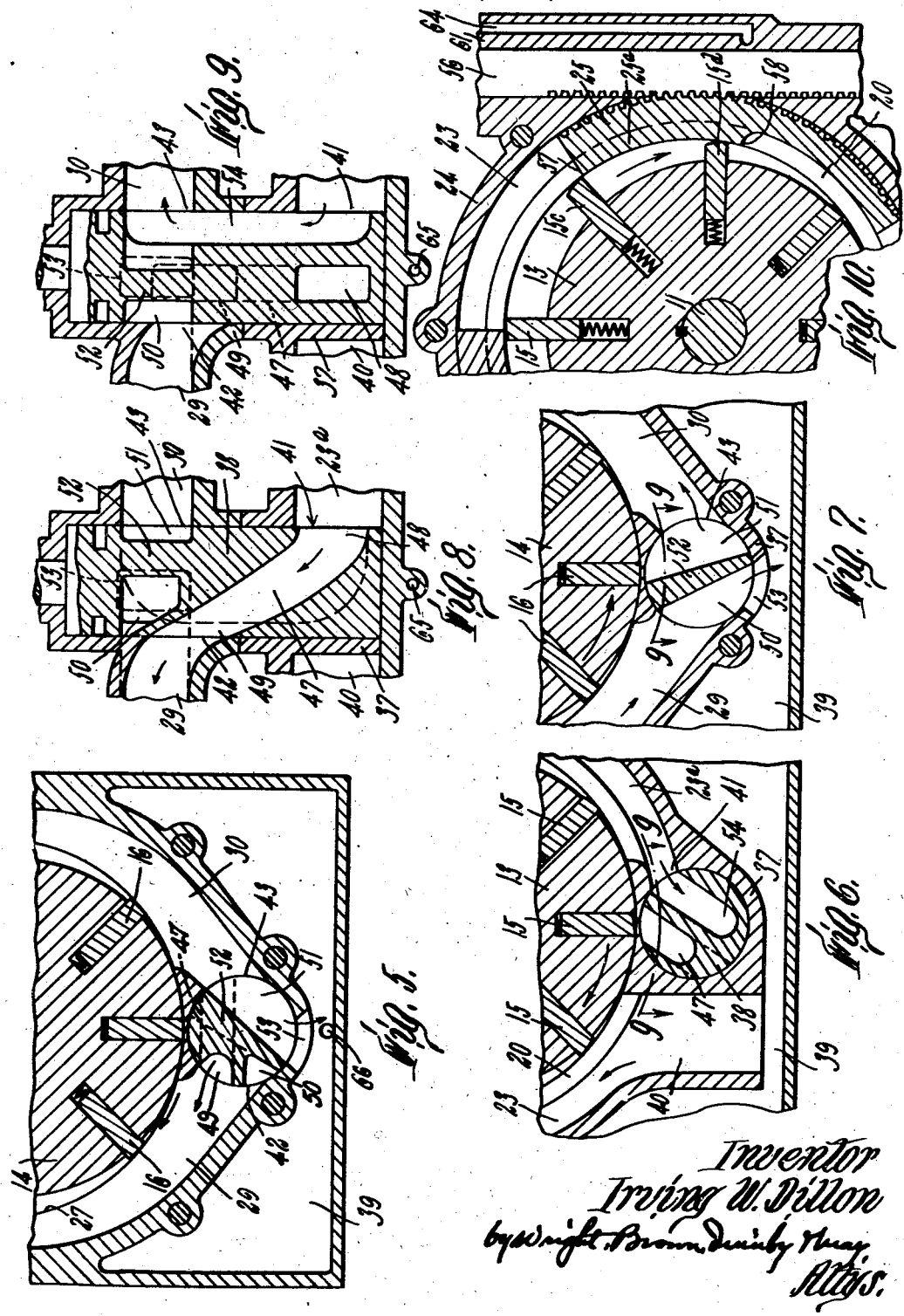

2,426,491

UNITED STATES PATENT OFFICE 2,426,491

VARIABLE DELIVERY MOVABLE VANE PUMP FOR A FLUID TRANSMISSION MECHANISM

Irving W. Dillon, Melrose, Mass.

Application April 1, 1944, Serial No. 529,110

3 Claims. (Cl. 103—120)

The present invention relates to means for transmitting power from a driver to a driven element and for varying the speed and reversing the direction at and in which the driven member is caused to run when the driver is caused to operate without change of speed. It is also applicable, of course, in situations where the speed of the driver may be changed, whereby the speed of the driven member becomes a function of variations both in the speed of the driver and adjustments of the transmission apparatus. This transmission means may be applied to many different uses, as for instance to automobiles between the motor and the axle or axles which drive the wheels, and in connection with many other machines of which variable speeds of operation are required, to be driven by electric motors, belts from transmission shafting, or any other prime mover or power delivering means operating at constant or variable speed.

The invention comprises in its broad aspects a pump, a hydraulic motor, a reversing valve in series connection with the pump and motor by which the direction of the motor may be reversed relatively to that in which the pump is driven, and a cut-off valve in association with the pump, adjustable to vary the discharge of liquid from the pump, and thereby regulate the speed of the motor relative to that of the pump. It further includes novel features of design and arrangement whereby all of the power put into the pump is put out by the hydraulic motor, minus friction losses, and the friction losses are reduced practically to the barest minimum. By means of these characteristics my objects of producing a highly efficient and compact power transmission device are fully realized.

One of the possible embodiments of the invention, which at present I prefer to others, is shown in the drawings provided herewith.

In these drawings,

Figure 1 is an axial section of such hydraulic apparatus.

Figure 2 is a cross section taken on line 2—2 of Figure 1.

Figure 3 is a cross section taken on line 3—3 of Figure 1.

Figure 4 is a horizontal axial section taken on line 4—4 of Figure 1.

Figure 5 is a partial section on line 5—5 of Figure 1, showing a detail of the valve.

Figure 6 is a partial section on line 2—2, showing the valve set for causing the motor to run in the opposite direction to the pump.

Figure 7 is a sectional view showing the lower part of Figure 3, with that part of the valve which appears in Figure 3 in its reversing position.

Figure 8 is a sectional view of the valve and adjoining passages taken on line 8—8 of Figures 2 and 3.

Figure 9 is a similar view taken on the line 9—9 of Figures 6 and 7.

Figure 10 is a partial sectional view similar to Figure 2 but showing the cut-off valve in a different position.

Like reference characters designate the same parts wherever they occur in all of the figures.

In the following description it will be assumed that the liquid used for transmitting force from the pump to the motor is oil; but the word "oil" as used in this connection is to be construed as typifying any liquid useable for this purpose, and not as a limiting term.

The principal parts of the apparatus comprise a driving shaft 11, a driven shaft 12, a cylindrical rotor 13 secured to the shaft 11, a cylindrical rotor 14 secured to the shaft 12, radial blades or vanes 15 carried by the rotor 12, radial blades or vanes 16 carried by the rotor 14, a chamber 17 in which the rotor 13 and the blades or vanes 15 carried thereby revolve, and a chamber 18 in which the rotor 14 and blades or vanes 16 revolve. The rotor 13, blades 15 and chamber 17 constitute a rotary pump. The end walls of the chamber are plane and perpendicular to the axis of the rotor, between which the rotor and blades fit with minimum clearance sufficient for lubricated movement. The clearances may be small enough to prevent appreciable leakage or, if necessary, the rotor and blades may be provided with packing means of known or other suitable character for this purpose. The chamber contains annular ribs 19 and 20 protruding inwardly from its opposite end walls, the inner surfaces of which are eccentric to the rotor axis and of cylindrical or other suitably continuous curvature. Such ribs are connected at the under side of the rotor by a web 21 which is tangent to the rotor and forms with the latter a seal between intake and discharge ports later described. The blades or vanes are under constant pressure acting to force them outward against the bounding surfaces of the chamber, such pressure being applied in any suitable way, as hydraulically, by spring means or otherwise. Here I have shown conventional helical springs 22 as typifying any means for that purpose.

The opening between the annular ribs 19 and 20 communicates with an annular space 23 bounded by the external wall 24 of the chamber casing. This annular space provides passageways for inflow and outflow of the oil or other working fluid and also furnishes a guiding channel for a cut-off valve 25 by which delivery of the pump is controlled. This valve is more fully described at a later point in this specification.

The rotor 14, the blades or vanes 16 carried thereby, and the chamber 18 constitute a hydraulic motor, which is substantially like the pump just described except as to certain particulars of the circumferential boundary of the casing 18. The latter casing has a surrounding wall 26 of larger radius than the rotor 14, and projecting inwardly from its end walls are ledges or shoulders 27 of cylindrical, or other suitably continuous curvature, which are tangent to the inner surface of the wall 26 at the upper side thereof and merge into a transverse web 28 tangent to the under side of the rotor 14. Between the ledges are channels 29 and 30 through which oil may flow into and out of the spaces bounded by the circumference of rotor 14 and the ledges 27. The blades or vanes 16 are or may be substantially like the blades 15 of the pump and are constantly pressed outward by springs or other yielding means against the eccentric surfaces 27.

The pump and motor are located near together and the adjacent end walls of their respective chambers are connected together in a unit construction, with only enough distance between them to provide room for bearings 31 and 32 for the inner ends of the shafts 11 and 12. This is an important feature of the invention for reasons later explained. Incidentally also the outer end walls of the chambers support, respectively, a bearing 33 and packing 34 for the driving shaft 11 and a bearing 35 and packing 36 for the driven shaft 12. The casing construction includes also a valve casing 37 in which is contained a reversing valve 38, and a container or reservoir 39 wherein an operating supply of oil is contained. The preferred details of construction of the casing structure, the parts of which it is composed, and the means for connecting such parts together, are clearly shown in the drawings and require no further description.

The annular space 23 in the pump chamber at one side of the rotor 13 communicates with a suction duct 40 which is constantly open to the interior of the oil reservoir 39 at a low point. The portion 23a of the annular space at the opposite side of the rotor opens into the valve chamber 37 through a port 41. In the motor casing the channels 29 and 30 lead to ports 42 and 43, respectively, in the valve chamber, which ports, of course, are spaced lengthwise of the valve chamber away from the port 41.

The valve chamber is cylindrical internally with its axis extending in generally the same direction as the shaft axes, and the valve 38 is complementarily cylindrical and is rotatable in the chamber. It has a stem 44 passing through a stuffing box 45 at one end of the valve chamber and carrying an operating arm 46 whereby it may be rotated and which may be connected to any suitable control linkage. The valve contains a through passage 47 (Figure 8) which is offset lengthwise of the valve and of which the opening 48 at one side is in the same zone with the port 41 and the opening 49 at the other side is in the same zone with the port 42. When the valve occupies the position shown in Figures 2, 3, 5 and 8, the valve passage 47 connects the outlet of the pump with the channel 29 of the motor and the rotor of the latter is then driven in the same direction as the pump rotor. The valve also contains passages or ports 50 and 51, separated by a web or partition 52, in the same zone with the channels 29 and 30 of the motor chamber. With the valve in the position last described, the channel 30 is in communication through port 43 and passage 51 with an outlet port 53 leading from the valve casing to the oil receptacle, and the channel 29 is shut off by the partition 52 from port 53.

The valve is also provided with a longitudinal channel 54, the opposite ends of which open from the same side of the valve in the same zones with the outlet port 41 of the pump and the channel 30 of the motor respectively.

With the valve in the position shown in Figs. 2, 3, 5 and 8, the channel 54 is displaced from the port 41. But by rotating the valve to the position shown in Figures 6, 7 and 9, the channel 54 is brought into register with port 41, so that it connects the pump outlet with the channel 30 of the motor and the passage on port 50 connects the channel 29 of the motor with the valve outlet port 53 to the oil tank. Then the motor is driven in the direction opposite to that of the pump rotor. Thus by a partial rotation of the valve in either direction, the direction in which the motor runs is quickly reversed.

The valve also may be put in a neutral position for stopping the motor without stopping the pump. When in that position, the web or partition 52 is substantially vertical, and its lower edge is between the boundaries of the port 53. Oil is then delivered to the motor casing at both sides of the valve and flows directly to the outlet port.

Control of the speed of the motor, independently of the pump speed, is effected by means of the cut-off valve 25. This valve is a segment of an annulus fitted to slide in the annular space 23 of the pump chamber, and having teeth 55 on its outer side whereby it may be moved through the agency of a rack bar 56. A portion 25a of the annular segment extends through the space between the ribs 19 and 20 of the pump chamber and has an inner surface flush and coaxial with the inner surfaces of the ribs, whereby it forms the outer wall of each pocket between two adjacent vanes and the rotor when two such vanes are adjacent to the ends of said portion. This portion 25a constitutes the cut-off valve proper; the rest of the annular segment, carrying the teeth, being part of the valve-operating means. The angular or circumferential extent of the valve proper is slightly greater than the distance between the outer extremities of two adjacent rotor vanes when such vanes are projected to the utmost. The valve proper terminates in shoulders 57 and 58. A filler block 59 is secured immovably in the upper part of the pump chamber, providing an abutment for one end of the cut-off valve when the latter is in the position shown in Figure 2. The inner surface of the filler block 59 is curved with a gradual curvature from approximate tangency with the outer circumference of the annular space 23 to registry, or near registry, with the inner surface of ribs 19 and 20.

When the space between two adjacent rotor vanes, as that between vanes 15a and 15b of Figure 2, is covered by the cut-off valve, a closed pocket is formed the volume of which is a measure of the delivery of the pump. That is, the volume of oil which the pump can deliver in one revolution is the volume of such pocket multiplied by the number of vanes. When the valve is located adjacent to the positions of maximum projection of the vanes, the pump delivery is a maximum. Figure 2 illustrates approximately this condition. But when the valve is shifted so as to bridge across two vanes when the latter are somewhat retracted, the volume of the pockets between the vanes is reduced and the delivery of the pump correspondingly diminished. Figure 10 illustrates an adjustment for such diminished delivery. No oil is entrapped in any pocket until the blade at the trailing end of the pocket (as the blade 15c in Figure 10) passes the terminal shoulder 57 of the cut-off valve. Until that point is reached the oil between that blade and the preceding blade (15d) can escape freely into the outer annular space 23. After the leading blade passes the shoulder 58, the oil in the pocket is expelled by the trailing blade. The range of adjustment of the cut-off valve shown here is nearly 90°, and within that range the capacity of the pockets may be varied greatly. By the employment of appropriate means, other than the rack and segment gearing here shown, for adjusting this valve, also within the contemplation and scope of the invention, or by employing more or fewer vanes than the eight here shown, adjustments of the valve are made possible whereby the volume of oil delivered by the pump is but a small fraction of the maximum delivery. As the ratio of motor speed to pump speed is determined by the quantity of oil transferred to the motor during each revolution of the pump, this means of regulating the pump delivery correspondingly regulates and varies the speed of the motor.

The rack 56 is slidingly contained in a guide 61 made as part of the casing structure. It is part of, or connected with, an operating rod 62 which extends from the casing and may be arranged for direct manipulation by an operator, or may be connected with a pedal, a crank, or any other suitable actuating means. Various means suitable for this purpose are well known, wherefore further description is unnecessary.

In order to counterbalance the back pressure of oil acting on the cut-off valve tending to return the valve against the filler block 59 after being displaced therefrom, the rack 56 is connected or provided with a piston 621 which fits in a cylinder or chamber 63, and a passageway 64 is formed in the casing structure to extend from a suitable point in the pump chamber near the outlet thereof to the cylinder 63 at the outer side of the piston. The area of the piston is, or may be, substantially equal to the cross-sectional area of the cut-off valve. In order to prevent oil from the pump and that leaking past the piston from escaping to the outside, a stuffing box 641 is provided to surround the operating rod 62 where the latter emerges from the casing.

Oil which escapes from the pump through the bearing 33 is returned to the oil reservoir 39 by a passageway 65, and oil leaking past the reversing valve is returned through a passageway 66. A similar passageway to that from bearing 33, not here shown, is or may be provided leading from the enclosed space 67 beyond the motor shaft bearing 35 back to the oil reservoir.

It will be apparent from the foregoing description and illustration that this invention is effective to fulfill the objects set forth in the beginning of this specification. The cut-off valve affords a simple and reliable means for regulating the speed imparted to the output shaft of the mechanism, the pump and the motor are both positive in their action, and they are located so closely together that almost no friction losses are suffered by the working fluid in passing from one to the other, and the reversing valve is simple and easily operated. The characteristics of the cut-off valve and its operating means, and the means for balancing the pressure of the fluid on the valve are important features of the invention.

Other structural features of the pump and motor are important also. The housings of both the pump and motor are designed to seal only the sections of their respective rotors between two adjacent vanes. This is necessary to avoid building up excessive back pressures. In the pump such section is that covered by the portion 25a of the cut-off valve. In the motor, the passages 29 and 30 nearly surround the rotor, but merge with the inner surface of the circumferential wall 26 at points in the upper part thereof substantially equidistant from the center line, (i. e. the common diameter of casing and rotor), and at a distance apart substantially equal to, or slightly greater than, the spacing between the outer extremities of two adjacent vanes. It is between these points of merger that the vanes 16 make sealing contact with the casing circumference. As the passages or channels 29 and 30 run all the way from the reversing valve to points near the narrow arc to which the sealing effect of the vanes is confined, the velocity of the oil traveling through the passages and against those vanes which are not in sealing position, has a reactionary influence which has a steadying effect on the movement of the rotor. This effect is equally applied when the motor runs in either direction. Possession of the features thus described makes my transmission device more efficient in the transmission of power than any of the prior pump and motor combinations of which I have knowledge.

What I claim and desire to secure by Letters Patent is:

1. In a hydraulic power-transmission apparatus, a rotary pump having a casing composed of end walls and a substantially cylindrical circumferential wall, annular ribs projecting inwardly from said end walls coaxial with the circumferential wall and a web extending between said ribs at one side of the axis of the casing, the casing having an inlet at one side and an outlet at the opposite side of said web, a rotor of smaller diameter than the inner boundary of said ribs mounted eccentrically in the casing in tangent contact with said web, substantially radial and radially movable vanes carried by said rotor in forcible engagement at their outer extremities with the ribs, a gear segment contained and movable circumferentially in the space between said ribs and the circumferential wall of the casing at the same side of the rotor and web as said outlet having a valve portion projecting between the ribs with its inner surface flush with the vane-confining surfaces of the ribs, such inner surface having an arcuate length as great as the distance between the extremities of two adjacent vanes and less than twice that distance, and a rack bar guided to move in a path tangent to the circumference of the casing having teeth in mesh with the teeth of said gear segment whereby to shift the segment in consequence of the endwise movement of said rack bar.

2. A rotary hydraulic pump comprising a cylindrical casing, a cylindrical rotor fitted to rotate in said casing in sealing contact at one side with a transverse portion of the casing, substantially radial and radially movable vanes carried by the rotor with equal angular spacing between them around the axis of the rotor, the casing having walls enveloping the rotor and providing an annular space surrounding the rotor except at the said transverse sealing part of the casing and having inlet and outlet openings to said annular space at respectively opposite sides of said sealing portion arranged to permit inflow and outflow of liquid, the casing also having guiding means eccentric to the rotor disposed to limit outward movement of said vanes and to cause retraction of the vanes as they approach said sealing portion during rotation, a valve mounted in the annular space of the casing having an arcuate surface which is flush with said guiding means and has a length slightly greater than the distance between the extremities of two adjacent vanes when the latter are farthest projected, the valve constituting the outer boundary of a pocket between such vanes and the rotor when the vanes are simultaneously in contact with the arcuate surface, and being movable around the axis of said guiding means from a position at the side of the rotor away from said sealing portion to positions nearer to said sealing portion for varying the delivery of the pump and having an arcuate series of gear teeth, a rack bar guided to move in a path tangential to said series of teeth in mesh therewith and being shiftable to place the valve in different positions of adjustment, a piston connected to said rack bar, a cylinder in which said piston is fitted and movable, and means for conducting pressure fluid from the delivery side of said pump to said cylinder; the area of the piston and the face thereof exposed to fluid pressure in the cylinder being of dimensions and so disposed as substantially to balance the pressure exerted tangentially on the valve by the fluid being delivered from the pump.

3. In a hydraulic power transmission apparatus, a rotary pump having a substantially cylindrical casing with inlet and outlet ports at opposite sides of and near to the diameter of the casing, a cylindrical rotor mounted eccentrically in said casing and in sealing contact with the circumference of the casing between said ports, substantially radial and radially movable vanes carried by the rotor, guide means in the casing arranged to control the vanes, permitting outward movement thereof as they leave the sealing contact in their rotation, and to force them inward as they approach the outlet port, a cut off valve mounted in the casing for angular movement in a path concentric with the axis of the casing at the delivery side of the rotor, said valve having an arcuate surface arranged to extend across the outer extremities of each two adjacent vanes in succession during their revolution, whereby to form a closed pocket with such vanes, the rotor and the end walls of the casing, and such arcuate surface being of such short length that each pocket so formed is open to the pump inlet until the trailing one of any two such vanes reaches one end of the surface, and directly thereafter the leading one of such vanes leaves the surface and opens the pocket into communication with the outlet port; said valve being movable to transfer its arcuate surface toward and away from the outlet port at the outlet side of the rotor in a path coaxial with the casing, whereby to vary the dimensions of said pockets and the discharge capacity of the pump.

IRVING W. DILLON.

REFERENCES CITED

The following references are of record in the file of this patent:

UNITED STATES PATENTS

| Number | Name | Date |
|---|---|---|
| 1,074,096 | Hammer | Sept 23, 1913 |
| 2,141,170 | Centervall | Dec. 27, 1938 |
| 2,166,423 | Clark | July 18, 1939 |
| 1,023,366 | Fabian | Apr. 16, 1912 |
| 466,660 | Duncan | Jan. 5, 1892 |
| 991,646 | Rich | May 9, 1911 |
| 1,028,451 | English | June 4, 1912 |
| 1,168,216 | Lape | Jan. 11, 1916 |
| 1,346,086 | Funk | July 6, 1920 |
| 2,159,941 | Guinness | May 23, 1939 |
| 1,482,807 | Newberg | Feb. 5, 1924 |

FOREIGN PATENTS

| Number | Country | Date |
|---|---|---|
| 699,591 | France | Dec. 16, 1930 |
| 463 | Great Britain | Jan. 7, 1913 |
| 216,525 | Great Britain | Nov. 27, 1924 |
| 3,888 | Great Britain | 1915 |